(12) United States Patent
Pinotti et al.

(10) Patent No.: US 9,209,717 B2
(45) Date of Patent: Dec. 8, 2015

(54) MOTOR STARTER CIRCUIT, PARTICULARLY FOR COMPRESSORS OF REFRIGERATORS

(75) Inventors: Ermanno Pinotti, Bergamo (IT); Ezio Puppin, Brugherio (IT)

(73) Assignee: ILLINOISE TOOL WORKS INC., Glenview, IL (US)

( * ) Notice: Subject to any disclaimer, the term of this patent is extended or adjusted under 35 U.S.C. 154(b) by 140 days.

(21) Appl. No.: 13/984,791

(22) PCT Filed: Feb. 6, 2012

(86) PCT No.: PCT/EP2012/051958
§ 371 (c)(1),
(2), (4) Date: Aug. 9, 2013

(87) PCT Pub. No.: WO2012/107399
PCT Pub. Date: Aug. 16, 2012

(65) Prior Publication Data
US 2013/0320909 A1    Dec. 5, 2013

(30) Foreign Application Priority Data

Feb. 11, 2011 (IT) ............................. M12011A0200

(51) Int. Cl.
| | |
|---|---|
| H02H 5/04 | (2006.01) |
| H02H 7/08 | (2006.01) |
| H02P 1/26 | (2006.01) |
| H02P 1/16 | (2006.01) |
| H02P 1/44 | (2006.01) |
| F04B 35/04 | (2006.01) |

(52) U.S. Cl.
CPC ................ *H02P 1/163* (2013.01); *F04B 35/04* (2013.01); *H02P 1/44* (2013.01)

(58) Field of Classification Search
CPC ........................... H02P 2005/4002; H02P 1/42
USPC ........................................................ 318/783
See application file for complete search history.

(56) References Cited

U.S. PATENT DOCUMENTS

| | | | | |
|---|---|---|---|---|
| 3,696,281 A | * | 10/1972 | Gramkow et al. | ............ 318/788 |
| 4,119,894 A | * | 10/1978 | Sorensen | ...................... 318/783 |
| 5,103,154 A | | 4/1992 | Dropps et al. | |
| 5,789,897 A | | 8/1998 | Hamatani | |

(Continued)

FOREIGN PATENT DOCUMENTS

| | | |
|---|---|---|
| CN | 1168023 A | 12/1997 |
| CN | 1655436 A | 8/2005 |

(Continued)

OTHER PUBLICATIONS

Corresponding IT 10 21192 Search Report dated Feb. 7, 2012.
Corresponding International Application PCT/EP2012/051958 Written Opinion and Search Report dated May 2, 2013.

*Primary Examiner* — Erick Glass
(74) *Attorney, Agent, or Firm* — Haupman Ham, LLP

(57) ABSTRACT

A motor starter circuit particularly for compressors of refrigerators, comprising a starter device (1), adapted to be connected to a starter winding (3) and to a steady-state winding (2) of an asynchronous motor, the windings (2, 3) being in turn connected to a power supply line (4, 5), a capacitor (6) being connected in parallel to the starter device (1), and further comprising a heat-sensitive element (7), which is adapted to be connected between the starter device (1) and the capacitor (6) and the starter winding (3).

20 Claims, 3 Drawing Sheets

(56) References Cited

U.S. PATENT DOCUMENTS

| | | | |
|---|---|---|---|
| 5,934,916 A * | 8/1999 | Latal et al. | 439/95 |
| 2002/0140396 A1 | 10/2002 | Puppin | |
| 2005/0168188 A1 | 8/2005 | Weihrauch | |
| 2006/0119308 A1 * | 6/2006 | Weigel | 318/778 |
| 2007/0114964 A1 * | 5/2007 | Gonthier | 318/788 |
| 2009/0160393 A1 | 6/2009 | Choi et al. | |
| 2009/0174359 A1 * | 7/2009 | Gonthier et al. | 318/786 |

FOREIGN PATENT DOCUMENTS

| | | |
|---|---|---|
| CN | 101369790 A | 2/2009 |
| CN | 101432953 A | 5/2009 |
| CN | 201541222 U | 8/2010 |
| DE | 10 2004 017 624 A1 | 8/2005 |
| EP | 0 319 404 A1 | 11/1988 |
| EP | 1 246 354 A1 | 10/2002 |

\* cited by examiner

MOTOR STARTER CIRCUIT, PARTICULARLY FOR COMPRESSORS OF REFRIGERATORS

RELATED APPLICATIONS

The present application is a National Phase of International Application Number PCT/EP2012/051958, filed, Feb. 6, 2012, and claims priority from, Italian Application Number MI2011A000200, filed Feb. 11, 2011.

The present invention relates to a starter circuit for motors, particularly for compressors of refrigerators, having improved characteristics.

More particularly, the invention relates to a starter circuit for asynchronous motors which is particularly but not exclusively suitable for a motor of a compressor for refrigerators.

As is known, in a refrigerator the compressor is operated in a cyclic manner, so as to pump the refrigerant into the coils of the refrigerator.

This operation of the compressor occurs when the temperature rises above a preset threshold. Therefore, a heat-sensitive element detects the temperature inside the refrigerator and when the temperature rises above a preset threshold sends an operation signal to the starter circuit of the compressor.

Such starter circuit comprises a device for protecting the motor of the compressor.

The device and the starter constitute the heat-sensitive element in which the flow of current increases the temperature, and this increase in temperature causes the element to behave like a resistor having a very high value, thus preventing the flow of current across it in order to reach the starter winding of the motor of the compressor.

However, this heat-sensitive element, despite being effective from the point of view of the intermittent operation of the asynchronous single-phase motor of the compressor, suffers the drawback of entailing a continuous power consumption, albeit a low one, during the entire period of operation of the motor.

In order to obviate this technical drawback, circuits are known in which an electronic starter is used which is connected in series to the starter winding of the refrigerator compressor motor; such circuit comprises means for generating pulses that decrease over time and are adapted to drive switching means (for example a triac) for the motor of the compressor to be started. The pulse generation means are supplied with alternating current.

It has been found that the absence of the heat-sensitive element, despite improving power consumption, during the period of operation of the motor, caused problems in starting the motor and moreover, in case of failure of the electronic circuit, the motor was unable to operate correctly and safely.

The aim of the present invention is to provide a starter circuit for motors, particularly for compressors of refrigerators, in which the starter circuit of the electronic type is improved with respect to conventional circuits, solving motor starting problems.

Within this aim, an object of the present invention is to provide a starter circuit for motors, particularly for compressors of refrigerators, in which, in case of failure of the electronic circuit, the motor can continue to operate correctly and safely.

Another object of the present invention is to provide a starter circuit for motors, particularly for compressors of refrigerators, in which the electronic starter is capable of ensuring a power-on time independently of the motor and therefore can be standardized on all motors.

Another object of the present invention is to provide a starter circuit for motors that is highly reliable, relatively simple to provide and at low costs.

This aim and these and other objects that will become better apparent hereinafter, are achieved by a starter circuit for motors, particularly for compressors of refrigerators, comprising a starter device, adapted to be connected to a starter winding and to a steady-state winding of an asynchronous motor, said windings being in turn connected to a power supply line, a capacitor being connected in parallel to said starter device, characterized in that it comprises a heat-sensitive element, which is adapted to be connected between said starter device and said capacitor and said starter winding.

Further characteristics and advantages of the invention will become better apparent from the description of a preferred but not exclusive embodiment of the circuit according to the present invention, illustrated by way of nonlimiting example in the accompanying drawings, wherein.

Figure 1:
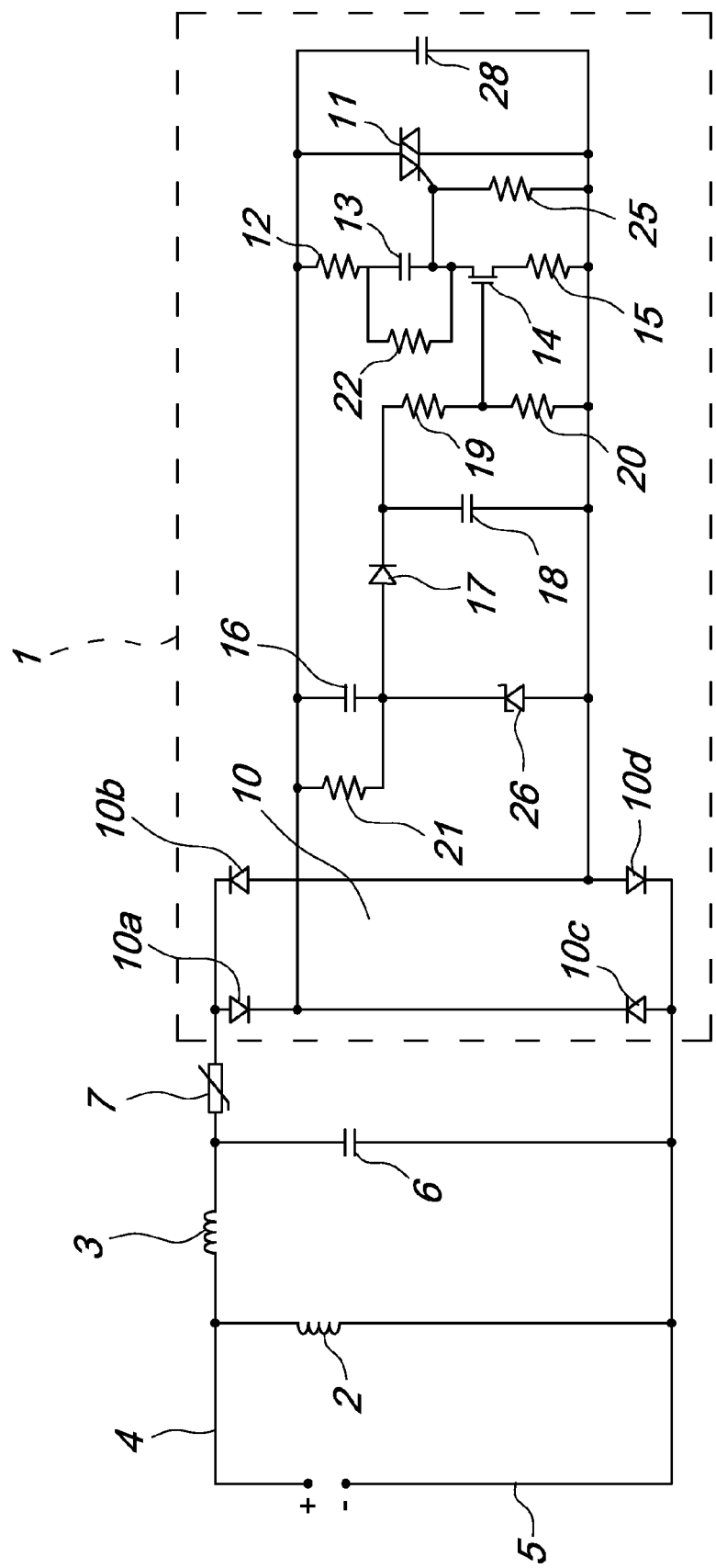
FIG. 1 is a circuit diagram of the circuit according to the invention.
Figure 2:
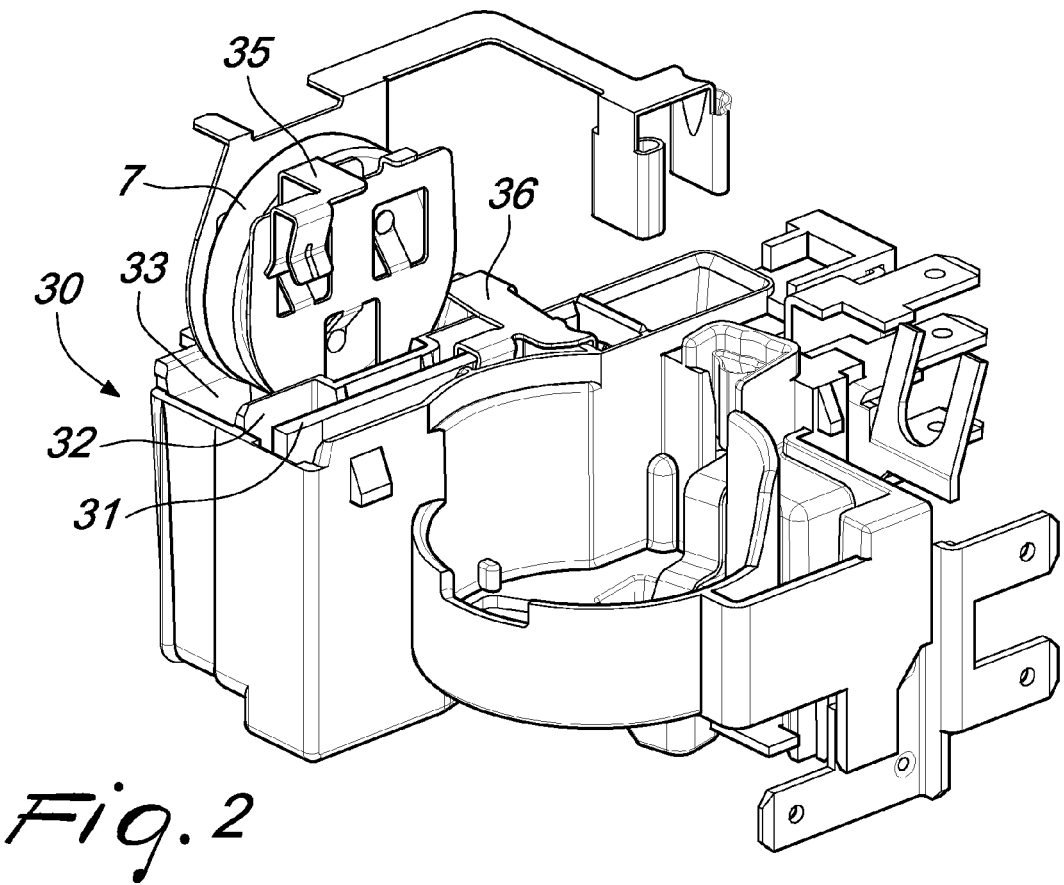
FIG. 2 is a perspective view of a terminal strip for compressors of refrigerators which accommodates the circuit according to the invention.

With reference to FIG. 1, the starter circuit according to the invention comprises a starter device 1, which is connected to a starter winding 3 of the motor of the compressor and to a steady-state winding 2 and comprises a rectifier bridge 10 which is constituted by four diodes 10a-10d, which are adapted to rectify a mains voltage and apply it to the terminals of a switching element 11, which can be constituted conveniently by a triac or by an SCR or by a BJT or by an IGBT or by a power MOSFET.

The gate terminal of the switching device 11 is powered by the voltage rectified by the diode bridge 10, by means of a resistive-capacitive network formed by a resistor 12 and by a corresponding capacitor 13 which is arranged in series thereto.

The resistor 12 and the capacitor 13 are also arranged in series to a transistor 14, which is conveniently of the bipolar or MOSFET or field-effect type, in which the source terminal is connected to a resistor 15 for thermal stabilization of the transistor. The resistor 15 can optionally be omitted.

The voltage rectified by the diode bridge 10 also supplies power to a capacitive divider, which is constituted by a first capacitor 16, a diode 17 and a second capacitor 18, which in turn has in parallel a pair of resistors 19 and 20 which are adapted to constitute a resistive divider and to draw the voltage across the second capacitor 18.

The gate terminal of the transistor 14 is connected to the common node between the two resistors 19 and 20.

The first capacitor 16 has in parallel a resistor 21 and the capacitor 13, which is arranged in series to the resistor 12, has in turn a resistor 22 connected in parallel.

The circuit designated by the reference numeral 1 is connected in parallel to a capacitor 6, which in turn is connected to the starter winding 3 and to the neutral 5 of the power supply line 4, 5 (where the reference numeral 4 designates the phase of the power supply line and the reference numeral 5 designates the neutral of the line).

In order to prevent the sudden discharge of the capacitor 6, which in turn is connected to the starter winding 3 and to the steady-state winding of the motor 2, from damaging the switch contained in the starter 1, i.e., the triac 11, the starter circuit according to the invention provides for the interposition, between the capacitor 6 and the starter 1, of a heat-sensitive element 7, which allows the discharge of the capacitor 6, limiting its discharge current and therefore preventing the discharge current that reaches the switch of the starter device from damaging said switch (triac).

Substantially, the heat-sensitive element or PTC 7 is connected between the starter device 1 and a common node to a capacitor terminal 6 and a terminal of the starter winding 3.

The use of the PTC heat-sensitive element 7 described above allows to protect the circuit, as cited above, and also allows to improve motor starting.

In case of failure of the electronic circuit 1, with the present PTC 7 the motor continues to operate correctly and safely.

The power-on time (i.e., the duration of startup) set by the circuit is practically independent of the type of PTC and therefore can be selected by the manufacturer of the motor without particular constraints.

This leads to another advantage, i.e., for substantially all motors the ideal power-on time is around 1 second. Shorter times make starting difficult, longer times increase consumption. However, with a single PTC model it is not possible to achieve this ideal time for all compressors and therefore different models require different PTCs.

The use of the electronic starter circuit 1 is instead capable of ensuring a power-on time of 1 second regardless of the motor and the circuit. Such circuit could therefore be standardized on all motors, leading to a saving in costs and to a simplification in supply, storage, traceability, etc.

The starter circuit according to the invention is provided on a printed circuit 31, which is adapted to be accommodated within a terminal strip 30 of the compressor of a refrigerator together with the PTC 7.

The terminal strip 30 therefore has a receptacle 32 for accommodating the printed circuit 31 and a receptacle 33 for accommodating the PTC 7.

The electrical contacts between the PTC 7 and the printed circuit 31 are achieved by means of metallic contacts 35 and 36, which at one end make contact with the PTC 7 and at the other end clamp the printed circuit 31, making contact with the pads defined on said printed circuit.

In this manner, the mounting of the PCT 7 and of the printed circuit with the corresponding contacts within the terminal strip 30 is extremely simplified.

Figure 4:
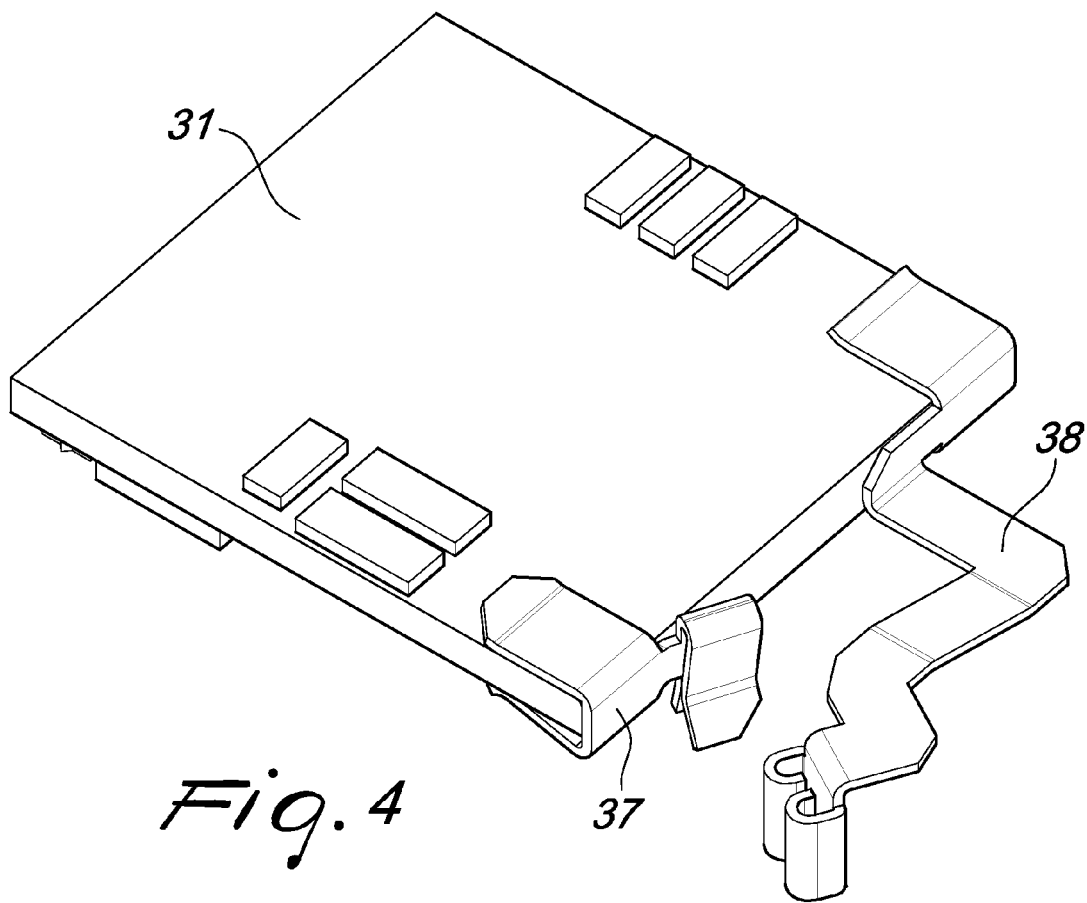
FIG. 4 is a perspective view of a printed circuit which provides the starter circuit according to the invention, with the corresponding electrical contacts.
Figure 5:
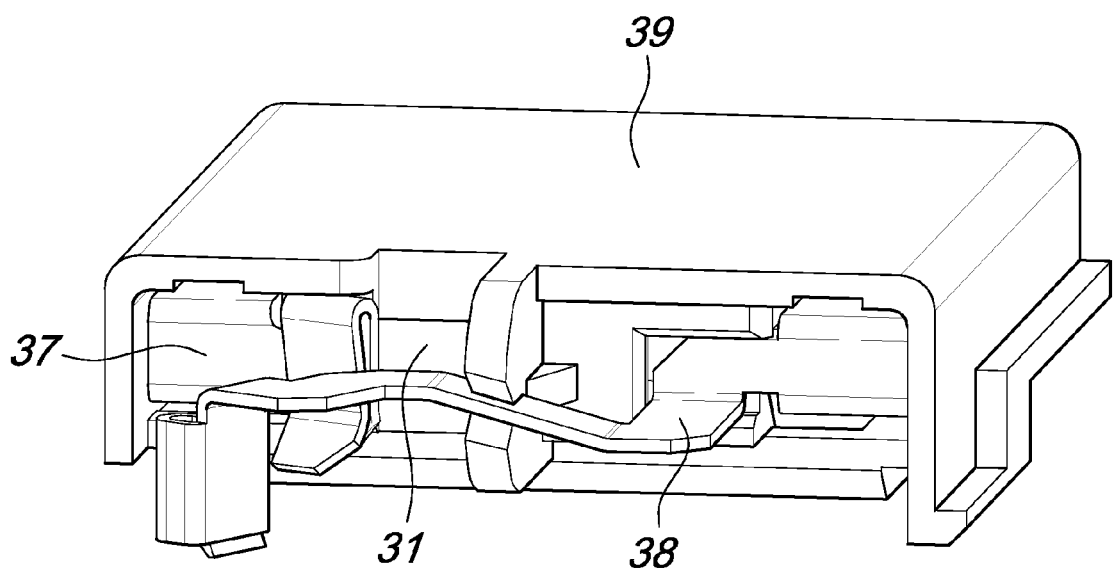
FIG. 5 is a perspective view of the container of the printed circuit of FIG. 4.

FIG. 4 is a view of the printed circuit 31 with adapted metallic contacts 37 and 38 (which are substantially similar to the contacts 35 and 36), provided so as to adapt the printed circuit to terminal strips for conventional compressors and not provided expressly for the starter circuit according to the invention.

The printed circuit 31 in this case is accommodated conveniently in an adapted container 39, from which the contacts 37 and 38 protrude. The container 39 in turn is designed to be mated to a conventional terminal strip.

With reference to the circuit described above, operation is as follows.

During power-on, the resistors 21 and 22 can be ignored, due to their high resistance value. These resistors will come into play during power-off, which will be described hereinafter.

Mains voltage supplies power directly to the steady-state winding 2, while the starter winding 3 is powered by means of the circuit of the starter. The mains voltage is rectified by the diode bridge 10 and is applied to the terminals of the switching device 11. The same rectified voltage supplies, by means of the network 12 and 13, the gate terminal of the switching device 11.

The MOS transistor 14 is initially off, so that the current that passes through the resistor 12 and the capacitor 13 initially partly enters the gate terminal of the switching device 11 and partly enters a temperature compensation resistor 25, which is connected in parallel to the MOS transistor 14.

The fraction of current that enters the gate terminal of the switching device, referenced hereinafter as triac for the sake of convenience, is sufficient to switch on the triac, which therefore conducts. Therefore, from the initial step, the starter winding 3 is powered across the path provided by the diode 10a, by the triac 11 and by the diode 10d during the positive half waves of the supply voltage and across the diode 10c, the triac 11 and the diode 10b during the negative half waves.

The voltage rectified by the diode bridge 10 also supplies the capacitive divider constituted by the first capacitor 16, by the diode 17 and by the second capacitor 18. However, while the capacitor 16 charges and discharges by following the supply voltage, the diode 17 prevents the capacitor 18 from discharging. Therefore, at each half wave the voltage across the capacitor 18 increases by a certain quantity, which depends on the values of the two capacitors (in the end, the voltage across the capacitor 18 will be limited by a Zener diode 26 arranged in parallel to the capacitor 18).

The voltage across the second capacitor 18 is drawn by the resistive divider constituted by the resistors 19 and 20 and supplies the gate terminal of the transistor 14.

During operation, increasing the voltage across the second capacitor 18 also increases the voltage applied to the gate terminal of the transistor 14, which at a certain point begins to conduct. By conducting, the transistor 14 discharges the current of the network 12, 13, which therefore no longer passes through the gate terminal of the triac 11 and is no longer capable of switching it on.

From this moment onward, the path that supplies power to the starter winding 3 is interrupted and the winding is no longer powered. The resistor 15 on the source terminal of the transistor 14 has the purpose of providing thermal stabilization of the operation of the transistor, but as mentioned it can be optionally omitted.

During starting, the capacitor 13 is charged to the mains voltage rectified by the diode bridge 10 and then is discharged immediately across the triac 11 as soon as it begins to conduct. When instead the triac is interrupted, at the end of starting, the capacitor 13 can no longer discharge through it and charges almost instantaneously at the mains voltage. From this point onward, the voltage accumulated on the capacitor 13 contrasts the mains voltage, preventing further flows of current through the network 12, 13 and the gate terminal of the switching device or triac 11. When the circuit is off, the currents of the several branches are therefore extremely low and power consumption is almost nil.

Figure 3:
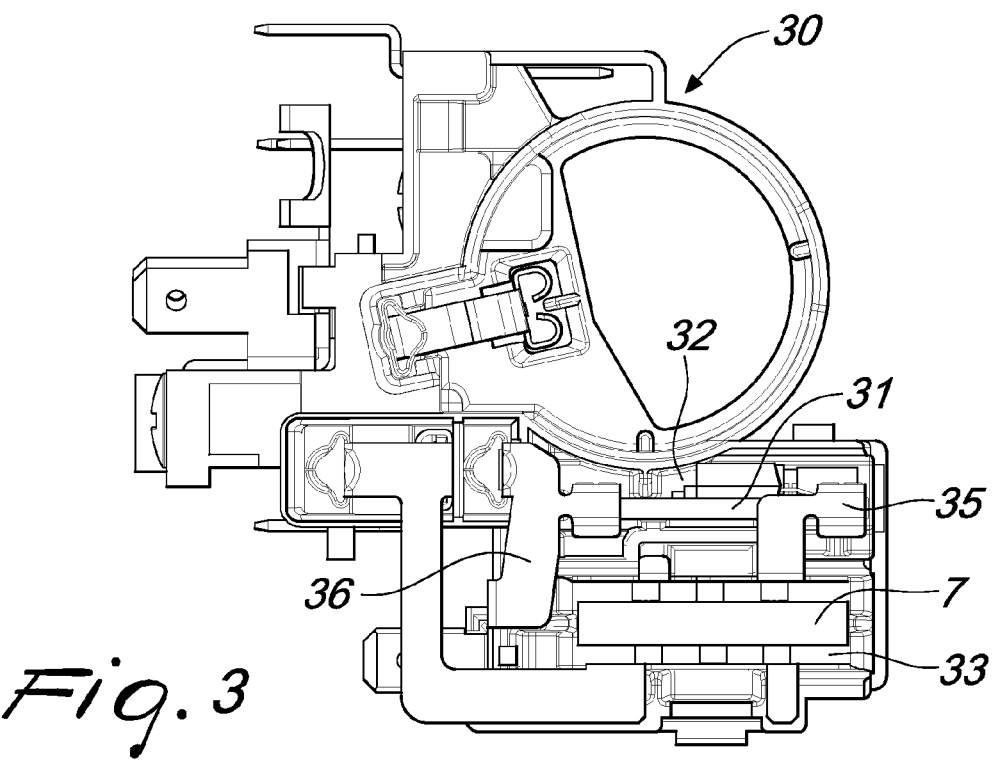
FIG. 3 is a top plan view of the terminal strip of FIG. 2.

The circuit of FIG. 3 can be provided or not with the capacitor 6 and with the corresponding heat-sensitive element 7.

When the power supply is removed from the motor, the capacitors 16 and 13 are discharged with a time constant of a few seconds, after which the circuit returns to the initial condition and is ready for another start. To make this discharge reproducible and reliable, high-value resistors, i.e., the resistors 21 and 22 respectively, are placed in parallel to the capacitors.

A further capacitor 28 can be connected in parallel to the switching device 11, with a so-called "snubbing" function, limiting the voltage transients across the triac, where they can lead to spurious power-ons. The presence of the capacitor 18 depends on the model of the triac 11 and may also not be necessary. Sometimes it is also possible to provide a low-value resistor in series to the capacitor 28.

The resistor 25 that can vary according to the temperature is designed to compensate for the variation of the characteristics of the switching device 11 as the temperature varies. The operation is as follows: as the temperature rises, the current of the gate terminal required to trigger the device 11 decreases considerably; at a high temperature, therefore, even the small current that arrives from the network 12, 13 when the circuit is off might become sufficient to switch on the triac 11 at unwanted times. As the temperature rises, however, the resistor 25 also reduces more and more its resistivity and drains an increasingly greater percentage of the current that arrives from the network 12, 13.

In this manner, the current that enters the gate terminal of the triac 11 is increasingly smaller as the temperature increases and remains always close to the critical trigger value. By selecting appropriately the value of the resistor 25 (and combining the resistor 25 in series with a normal resistor) it is possible to compensate the circuit throughout the range of temperatures of operation.

In practice it has been found that the starting circuit according to the invention fully achieves the intended aim and objects, since it allows to avoid damage of the switch that is present in said starter device caused by the discharge of the capacitor connected in parallel to the starter device.

Substantially, the presence of the heat-sensitive element connected between the starter device and the capacitor allows to start effectively the motor and at the same time to limit the discharge currents that arrive from said capacitor despite not producing any appreciable effect on the operation of the motor that is connected to the starter circuit according to the invention.

The circuit thus conceived is susceptible of numerous modifications and variations, all of which are within the scope of the appended claims; all the details may further be replaced with other technically equivalent elements.

The disclosures in Italian Patent Application No. MI2011A000200 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A motor starter circuit particularly for compressors of refrigerators, comprising a starter device, adapted to be connected to a starter winding and to a steady-state winding of an asynchronous motor, said windings being in turn connected to a power supply line, a capacitor being connected in parallel to said starter device, wherein it comprises a heat-sensitive element, which is adapted to be connected between said starter device and said capacitor and said starter winding.

2. The starter circuit according to claim 1, wherein said heat-sensitive element is connected to a common node between a terminal of said capacitor, a terminal of said starter winding, and a terminal of said starter device.

3. The starter circuit for motors according to claim 1, wherein said starter device comprises a rectifier bridge which is adapted to supply power to a switching device, a gate terminal of said switching device being powered by means of a resistive-capacitive network and a capacitive divider which is powered by said bridge, the voltage drawn across said capacitive divider being adapted to supply power to a transistor which is connected in series to said resistive-capacitive network, said starter winding being powered until said transistor switches on, said switching device being switched off as a consequence of the switching on of said transistor.

4. The starter circuit according to claim 3, wherein said capacitive divider comprises a first capacitor connected to a diode which in turn is connected to a second capacitor, said second capacitor being connected in parallel to a resistive divider.

5. The starter circuit according to claim 3, wherein said switching device is a triac.

6. The starter circuit according to claim 3, wherein said switching device is an SCR.

7. The starter circuit according to claim 3, characterized in wherein said transistor is a MOSFET.

8. The starter circuit according to claim 3, wherein said transistor is a bipolar transistor.

9. The starter circuit according to claim 3, wherein said transistor is a field effect transistor or an IGBT.

10. A terminal strip for compressors of refrigerators, wherein it comprises a receptacle for a starter circuit according to claim 1, said receptacle accommodating a printed circuit on which said starter circuit is provided, a further receptacle being provided in order to accommodate said heat-sensitive element of said starter circuit, a connection between said heat-sensitive element and said printed circuit being provided by means of metallic contacts, which are adapted to make contact with said heat-sensitive element on one side and to clamp said printed circuit on the other side in order to provide electrical contacts with pads of said printed circuit.

11. An appliance, comprising:
an asynchronous motor including a starter winding and a steady-state winding;
a starter device connected to the starter winding and the steady-state winding, wherein
the windings are connected to a power supply line,
the appliance further includes:
a capacitor connected in parallel to said starter device; and
heat-sensitive element connected between said starter device and said capacitor and said starter winding.

12. The appliance of claim 11, wherein:
the starter device is located on one side of a circuit of the appliance; and
the starter winding, the steady-state winding, the power supply, the capacitor and the heat-sensitive element are all located on another side of the circuit of the appliance.

13. The appliance of claim 11, wherein:
the appliance includes a circuit that extends from the starter device back to the starter device;
the circuit passes through the power supply;
the circuit extends from the starter, through the heat-sensitive element, through the starter winding, to the positive side of the power source, and then from the negative side of the power source back to the starter.

14. The appliance of claim 13, wherein:
a first terminal of the capacitor is located between the heat-sensitive element and the starter winding;
a second terminal of the capacitor is located between the negative side of the power source and the starter;
a first terminal of the steady-state winding is located between the starter winding and the positive side of the power source; and
a second terminal of the steady-state winding is located between the negative side of the power source and the starter.

15. The appliance of claim 14, wherein:

the second terminal of the steady-state winding is located between the negative side of the power source and the second terminal of the capacitor; the appliance includes a circuit that extends from the starter device back to the starter device;

the circuit passes through the power supply;

the circuit extends from the starter, through the heat-sensitive element, through the starter winding, to the positive side of the power source, and then from the negative side of the power source back to the starter.

16. The appliance of claim 11, wherein:

the heat-sensitive element is located in series with the capacitor;

the heat-sensitive element is located in series with the starter winding;

the starter winding is located in parallel with the capacitor;

the starter winding is located in series with the power source;

the steady state winding is located in parallel with the power source;

the steady state winding is located in series with the starter winding;

the steady state winding is located in parallel with the capacitor;

the power source is located in series with the heat-sensitive element and the starter winding; and the power source is located in parallel with the steady state winding and the capacitor.

17. The appliance of claim 11, wherein:

the appliance includes a circuit that extends from the starter device back to the starter device;

the circuit extends from a first terminal of the starter device, through the heat-sensitive element, through the starter winding, through the power supply, and from the power supply to a second terminal of the starter device;

the circuit includes a first sub-circuit extending from between the heat-sensitive device and the starter winding through the capacitor to a first location between the power supply and the second terminal of the starter device; and the circuit includes a second sub-circuit extending from between the starter winding and the power supply to a second location between the power supply and the second terminal of the starter device.

18. The appliance of claim 11, wherein:

the second location is between the power supply and the first location.

19. The appliance of claim 11, wherein:

the appliance is a refrigerator; and the starter device is a starter for a compressor of the refrigerator.

20. A refrigerator, comprising:

a compressor; and the motor starter circuit of claim 1, wherein the starter device is configured to start the compressor.

\* \* \* \* \*